No. 815,435. PATENTED MAR. 20, 1906.
M. E. KNAUFF.
NIPPLE FOR NURSING BOTTLES.
APPLICATION FILED OCT. 25, 1905.

Witnesses
Harry L. White
James E. Babcock

Inventor
Mary E. Knauff
by Frank J. Campbell
her Attorney

UNITED STATES PATENT OFFICE.

MARY E. KNAUFF, OF AVALON, PENNSYLVANIA.

NIPPLE FOR NURSING-BOTTLES.

No. 815,435.

Specification of Letters Patent.

Patented March 20, 1906.

Application filed October 25, 1905. Serial No. 284,291.

*To all whom it may concern:*

Be it known that I, MARY E. KNAUFF, a citizen of the United States of America, residing at Avalon, in the county of Allegheny and State of Pennsylvania, have invented certain new and useful Improvements in Nipples for Nursing-Bottles, of which the following is a specification.

My invention relates to nipples for nursing-bottles.

In the ordinary form of nipple, that in which no opening is provided except the opening through which the milk passes, it has been found that the air contained in the nursing-bottle soon becomes exhausted, creating a partial vacuum in said bottle and causing the nipple to collapse. This of course prevents the infant from drawing any more milk from the bottle, and said bottle is practically useless until the nipple is removed therefrom to permit the ingress of air to said bottle. The necessity of frequently removing the nipple for this purpose is a source of much annoyance and trouble to mothers and nurses. In many instances the fact that the nipple has collapsed is not discovered for some time. In the meanwhile the infant tries to draw milk through the collapsed nipple, which causes its mouth to become sore and tends to produce colic. It is to provide means for obviating the foregoing difficulties that the present invention is particularly designed.

A further object of the invention is the provision of a nipple which may be easily cleansed, readily applied to or removed from the nursing-bottle, and one that will be economical to manufacture.

Further objects and advantages of the invention will be set forth in the detailed description which now follows.

Figure 2:
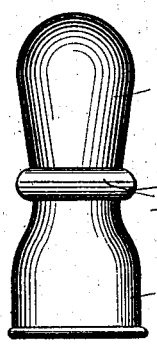
Figure 1:
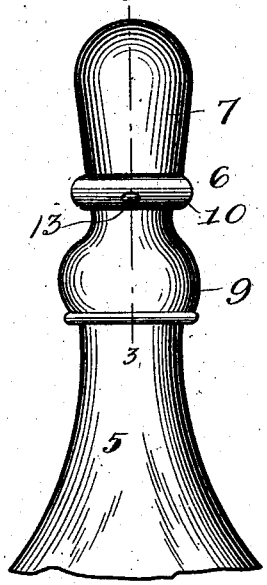
Figure 4:
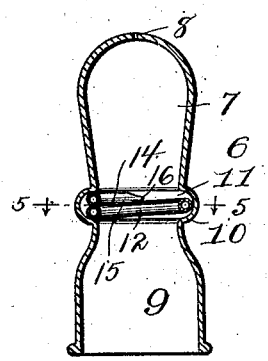
Figure 3:
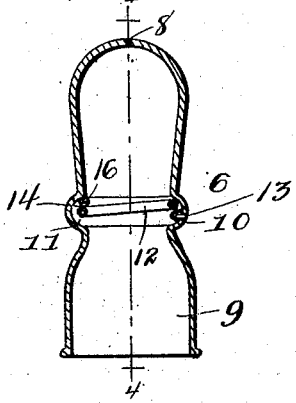
Figure 6:
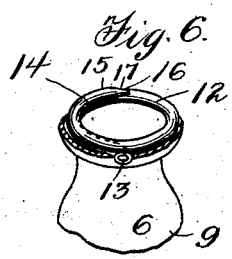
Figure 5:
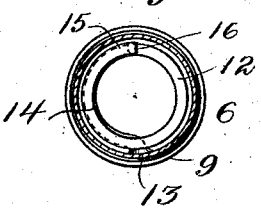
Figure 7:
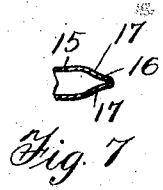

In the accompanying drawings, Figure 1 is a side elevation of a portion of a nursing-bottle to which my improved nipple has been attached. Fig. 2 is a side elevation of the nipple. Fig. 3 is a transverse sectional view of the nipple upon line 3 3 of Fig. 1. Fig. 4 is a transverse vertical sectional view of the nipple upon line 4 4 of Fig. 3. Fig. 5 is a horizontal section upon line 5 5 of Fig. 4, with an air-tube, hereinafter described, in elevation. Fig. 6 is a detail perspective view of said air-tube and a portion of the nipple, and Fig. 7 is a detail sectional view of the end of said air-tube.

Like numerals designate corresponding parts in all of the figures of the drawings.

Referring to the drawings, the numeral 5 designates the neck portion of a nursing-bottle, and 6 designates a nipple attached thereto. This nipple comprises a nursing portion 7, provided with the usual orifice 8 for the passage of milk to the mouth of the infant, a depending flange 9 for engaging the neck of the bottle in the usual manner, and an intermediate annular extension 10, forming an annular recess 11 about the interior of the nipple at the juncture of portions 7 and 9.

Vulcanized within the wall of extension 10 is a coiled air-tube 12, the mouth of which is open to the atmosphere, as at 13. As will be seen by referring to Fig. 6, this tube is given about one and one-half turns and lies in the annular recess 11. It will therefore be seen that for about half a turn or for a distance equal to half the circumference of recess 11 the upper part of the coil overlies and rests upon the lower part of said coil. At said juncture of the upper and lower portions of the coils they may be vulcanized to each other, if desired. This vulcanization of the coils, as at 14, holds the coil as a whole into proper shape when the nipple is turned wrong side out for the purpose of cleansing the same. The free end 15 of tube 12 is flattened, as at 16. This, in effect, produces a check-valve at that point, for the weight of the milk upon the inclined walls 17 of the end of the tube will prevent the passage of milk into the said tube, while the pressure of air on the inner surfaces of said walls when the pressure of the atmosphere exceeds the pressure within the bottle will open the lips of the end of the tube to permit the passage of air therethrough.

I am aware that nipples having a vent formed therein for the passage of air to the interior of the bottle have been used; but a nipple of this character in order to prove a commercial success must not only provide means for the passage of air to the interior of the bottle, but must be so constructed that they may be made at a very low cost, may be readily cleansed of sour and curdled milk, and may be applied to the bottle with little trouble. Devices of this character have been used having air-inlet valves formed directly in the base of the nipple. In order to accomplish this, the bases of the nipples must be made so thick that it is practically impossible to turn them wrong side out, which is the only effectual way of cleansing them. Devices have also been provided having a tube opening through the side of the nipple, the free end of the tube hanging into the bottle. With this form of nipple it has been found that where a long tube is used, long enough to hang below the surface of the milk, the nipple collapses before the atmospheric pressure overcomes the pressure of what air remains in the bottle plus the weight of the milk. Any tube that depends into the mouth of the bottle will rest below the surface of the milk, for it must be borne in mind that the normal position of a nursing-bottle is a nearly horizontal one. With the improved nipple herein shown and described the air-inlet tube is held above the surface of the milk except when the bottle is entirely inverted. When it is desired to attach the nipple to a bottle, the open end thereof is free of any obstruction to the ready attachment thereof. When it is desired to clean the nipple, it may be readily turned wrong side out, the vulcanization of the coils of the tube maintaining said tube in shape to slip back into recess 11 when the nipple is restored to its original position.

From the foregoing description it will be seen that simple and efficient means are herein provided for accomplishing the objects of the invention; but it is to be understood that I am not limited to the exact construction shown, but that such changes as may be made within the scope of the appended claims may be resorted to, without departure from said invention.

Having described my invention, what I claim is—

1. The combination with a nipple for nursing-bottles, of a coiled air-tube which lies entirely within said nipple in a horizontal plane, one end of said tube being open to the atmosphere and the other end of said tube opening into the interior of the nipple.

2. A nipple for nursing-bottles having a tube located and lying entirely therein, one end of said tube being open to the atmosphere and the other end of said tube being open to the interior of the nipple and a check-valve on the latter end of said tube.

3. A nipple for nursing-bottles having a coiled air-tube lying entirely therein, one end of said tube being open to the atmosphere and the other end of said tube being open to the interior of the nipple, the coils of said tube being attached to each other in such manner that said tube will retain its coiled shape when the nipple is turned wrong side out.

4. A nipple for nursing-bottles having an annular recess formed therein, a coiled air-tube lying in said recess and a valve formed on the end of said tube.

5. A nipple for nursing-bottles, having an annular recess formed therein and a coiled air-tube which lies in said recess, one end of said tube being open to the atmosphere and the other end of said tube being open to the interior of the nipple.

6. A nipple for nursing-bottles having an annular recess formed therein, a coiled air-tube lying in said recess, one end of said tube being open to the atmosphere and the other end of said tube being open to the interior of said nipple, a valve formed upon the latter end of said tube and the coils of said tube being attached to each other substantially as described.

In testimony whereof I affix my signature in presence of two witnesses.

MARY E. KNAUFF.

Witnesses:
M. M. HAMILTON
IDA A. BOYLE.